United States Patent
Feng et al.

(10) Patent No.: US 11,032,538 B2
(45) Date of Patent: Jun. 8, 2021

(54) METHOD FOR CONTROLLING AND INSPECTING DEVICE OR DEVICES GOVERNING A LIGHT SOURCE FOR TESTING CAMERA, AND COMPUTING DEVICE USING METHOD

(71) Applicant: TRIPLE WIN TECHNOLOGY(SHENZHEN) CO.LTD., Shenzhen (CN)

(72) Inventors: Rui Feng, Shenzhen (CN); Wen-Tseng Chiang, New Taipei (TW); Yu-Tsang Tu, New Taipei (TW); Yen-Sheng Lin, New Taipei (TW); Ying-Quan Zhao, Shenzhen (CN)

(73) Assignee: TRIPLE WIN TECHNOLOGY (SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 16/697,604

(22) Filed: Nov. 27, 2019

(65) Prior Publication Data

US 2021/0099694 A1    Apr. 1, 2021

(30) Foreign Application Priority Data

Sep. 27, 2019 (CN) .......................... 201910927829.9

(51) Int. Cl.
H04N 17/00 (2006.01)
(52) U.S. Cl.
CPC ................................. *H04N 17/002* (2013.01)
(58) Field of Classification Search
CPC .................................................. H05N 17/002
USPC ........................... 362/3–18; 396/4, 106–110
See application file for complete search history.

(56) References Cited

U.S. PATENT DOCUMENTS

| 7,884,734 B2 * | 2/2011 | Izadi ..................... H04W 76/14 340/686.6 |
| 8,154,608 B2 * | 4/2012 | Ishii ....................... H04N 5/232 348/211.1 |
| 2007/0189026 A1 * | 8/2007 | Chemel ................ H05B 47/155 362/458 |

FOREIGN PATENT DOCUMENTS

CN    102591994 A    7/2012

* cited by examiner

*Primary Examiner* — Jason M Han
(74) *Attorney, Agent, or Firm* — ScienBiziP, P.C.

(57) ABSTRACT

A method of inspecting and controlling applied to a process of a testing a camera for correct color temperature in image-capturing includes: obtaining a first device identifier of light sources; obtaining a second device identifier of control devices; wherein each control device governs the opening or closing of a light source; associating the first device identifiers with each second device identifier, and generating a binding list; obtaining the second device identifier corresponding to a camera device; comparing the second device identifier corresponding to the camera device with the binding list, and recording the corresponding first device identifiers; wherein the camera device takes pictures under the light source corresponding to the first device identifiers to obtain image for analysis and analyzing whether image-capturing function of the camera is normal. A computer device and a storage medium for performing the above-described method are also disclosed.

17 Claims, 4 Drawing Sheets

METHOD FOR CONTROLLING AND INSPECTING DEVICE OR DEVICES GOVERNING A LIGHT SOURCE FOR TESTING CAMERA, AND COMPUTING DEVICE USING METHOD

FIELD

The subject matter herein generally relates to computing devices.

BACKGROUND

During a camera test, the camera captures image of light source at color temperatures of 2800 and 5000 to obtain images, then image capturing functions of the camera are assessed. The color temperature of the light source needs to be calibrated to 2800 and 5000 before the test. Since each camera needs to separately capture multiple light sources at the color temperatures, manually checking and selecting the camera is necessary. Such an inspection method is labor and time intensive, and the inspection results may not be accurate.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
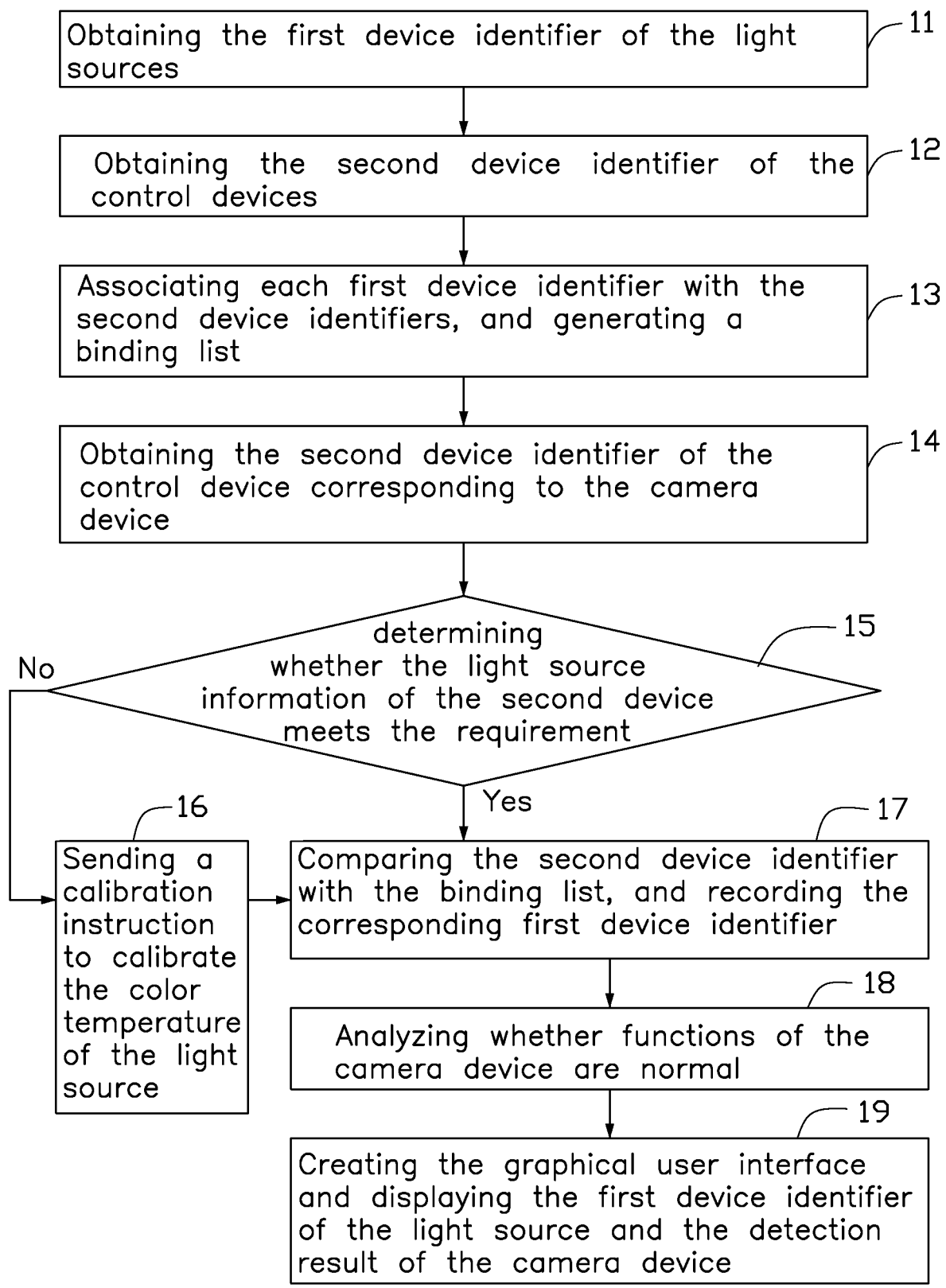
FIG. 1 is flowchart of an embodiment of a method for inspecting and controlling a light-governing device by computer.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 shows a flow chart of one embodiment of a method for inspecting and controlling a device, of the present disclosure.

In one embodiment, the method can be applied to a computer device. For a computer device that needs to inspect a device, the function for inspecting provided by the method of the present disclosure can be directly integrated on the computer device, or run on the computer device in the form of a software development kit (SDK).

Figure 4:
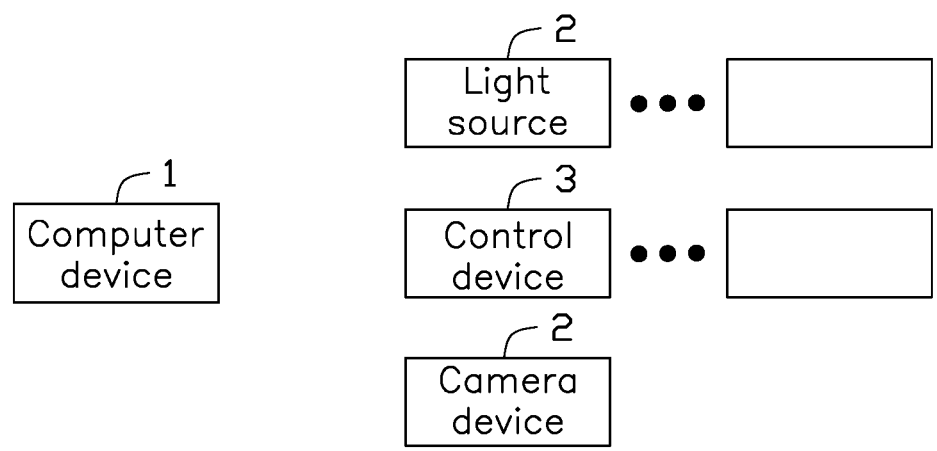

As shown in FIG. 1, the inspecting method according to the embodiment of the present disclosure includes the following steps:

At block 11, the computer device can obtain a first device identifier of a plurality of light sources 2 (shown in FIG. 4).

In the embodiment, the light sources 2 are classified into class A, class B, and class C. Class A is a light source 2 of about 2800 color temperature, class B is a light source 2 of about 5000 color temperature, and class C is a light source of about 6500 color temperature.

The number of each type of light source 2 is three, the first device identifiers of the class A light source are respectively A1, A2, and A3, the first device identifiers of the class B light source are respectively B1, B2, and B3, and the first device identifiers of the class C light source are respectively C1, C2, and C3.

In another embodiment, the number of the light sources 2 is greater than three. The first device identifier is the network identifier of the light source or a custom serial number, and the network identifier includes at least an IP address or a MAC address.

In the embodiment, the color temperature is a scale of colors of a light source equivalent to colors given off during heating.

At block 12, the computer device can obtain a second device identifier of a plurality of control devices 3 (shown in FIG. 4).

In the embodiment, the control device 3 may be a desktop computer, a notebook computer, a cloud server, or a smart phone. The control device 3 communicates with a corresponding light source, and each control device 3 controls the switching on or off of the plurality of corresponding light sources 2.

In the embodiment, the second device identifier is the network identifier, and the network identifier includes at least an IP address or a MAC address. The network identifier also includes other identifiers that can identify the device, such as a port number.

At block 13, the computer device can associate each first device identifier with the second device identifiers, and generate a binding list.

In the embodiment, each second device identifier respectively corresponds to a first device identifier of the class A, a first device identifier of the class B, and a first device identifier of the class C.

In other embodiment, the plurality of second device identifiers respectively corresponds to a first device identifier of the class A, a first device identifier of the class B, and a first device identifier of the class C.

For example, the second device identifiers of three control devices 3 are respectively 192.168.79.100, 192.168.79.108, and 192.168.79.109, and the three control devices 3 are respectively bound to the three light source identifiers A1, B1, and C1.

In one embodiment, the computer device can configure static IP addresses for each control device 3. For example, the first control device controls a camera device 4 (shown in FIG. 4) in a first test area, and the IP address of the first control device is 192.168.1.100. The seventh control device controls the camera device in a seventh test area, and the IP address of the seventh control device is 192.168.7.106. The IP address of the control device is 192.168.AB. Letter "A" represents the number range of the test area is 0255, and letter "B" represents the control device number ranges from 100 to 111. For example, the IP address of the seventh control device in second test area is 192.168.1.106, and the IP address of the first control device in the eighth test machine is 192.168.7.100.

The IP address of each control device 3 is a static IP address. When the control device 3 is replaced, the IP address of the new control device 3 can be changed to the IP address of the old control device 3, to ensure the validity of the binding list.

In other embodiment, the computer device may further dynamically adjust a relationship between each of the second device identifiers and the plurality of the first device identifiers.

The computer device has different requirements according to the light source information of the light sources 2 by different camera devices 4, or changes in the performance of the camera device 4. For example, a certain type of the light source 2 is damaged or the light source device may be in a service period. The new light source to be tested replaces the old or damaged or unserviceable one, so as to dynamically adjust the corresponding relationship of the light source corresponding to each control device 3.

In the embodiment, the static IP of each light source can be adjusted by configuration to achieve the correspondence between the adjustment control device and the light source. Each light source 2 is configured with a static IP as the device identifier of the light source 2.

In other embodiment, a custom identifier can be set as the device identifier of the light source 2, and the device identifier of the light source is changed to adjust the correspondence relationship between the control device and the light source. The correspondence relationship may include a correspondence between a control device 3 and a plurality of the light sources 2, and the correspondence relationship between the plurality of control devices 3 and the plurality of the light sources 2.

At block 14, the control device obtains a second device identifier of the camera device 4.

In one embodiment, a robot brings the camera device 4 to a detection area of the corresponding control device 3, and each control device 3 controls the camera device 4 to capture an image. Each control device 3 detects whether the image-capturing function of the camera device 4 is normal. The control device 3 obtains the second device identifier of the control device 3 by sending a remote command.

In another embodiment, the control device 3 communicates with the camera device 4, the control device 3 can control the camera device 4 to capture a picture, and the control device 3 can also control the camera device 4 to send the picture to a preset position for subsequent picture analysis.

At block 15, the computer device can obtain the light source information of the second device identifier corresponding to the first device identifier, and the computer device can determine whether the light source information meets the requirements. If the light source information meets the requirements, block 17 is implemented, otherwise block 16 is implemented.

In one embodiment, the computer device can determine whether the light source information of the light source 2 meets the requirements according to the detection requirement of the camera device 4. The light source information may include the color temperature in the light source.

In another embodiment, the light source information may further include light intensity, light color, and light brightness.

At block 16, the computer device can send a calibration instruction to a color calibrator (not shown), to calibrate the color temperature of the light source.

In another embodiment, the control device 3 sends a control instruction to the light source 2, and the light source 2 adjusts the light source information. For example, the color or brightness of the light source can be changed.

At block 17, the computer device can compare the second device identifier with the binding list, and record the corresponding first device identifier. The camera device 4 sequentially takes a picture under the light source corresponding to the first device identifier, to obtain an image.

In the embodiment, the computer device can compare the second device identifier with the second device identifier in the binding list, to obtain the corresponding first device identifier, and further obtain one or more corresponding light sources. The control device 3 controls the light sources 2 to be turned on sequentially. The camera device 4 sequentially takes pictures under the light source corresponding to the first device identifier, and further obtains a plurality of images captured by the camera device 4.

In one embodiment, when the light source information of the light source 2 does not meet the detection requirement of the camera device 4, the computer device may output a warning, such as sound and light alarm or email alarm. The computer device may also control a graphical user interface (not shown) to display a prompt, to prompt the user.

At block 18, the computer device can analyze whether the function of the camera device 4 is normal.

In the embodiment, the computer device can analyze whether the function of the camera device 4 is normal according to the light source information of the light source 2 and the pictures captured by the camera device 4.

At block 19, the computer device can display the first device identifier of the light source and the result of analysis of the camera device 4 through the graphical user interface.

Figure 2:
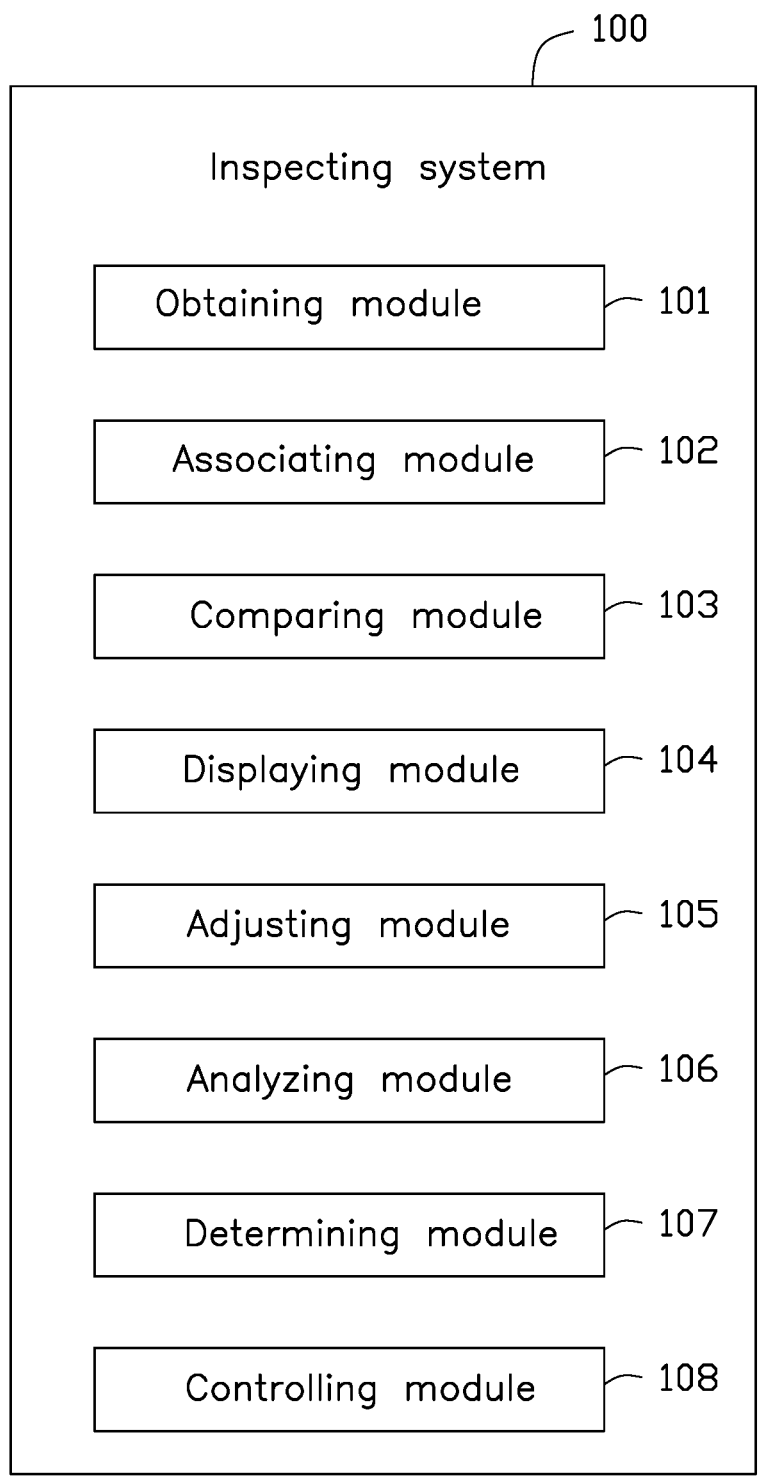
FIG. 2 is a block diagram of an embodiment of a system for inspecting and controlling the light-governing device.

FIG. 2 illustrates an inspecting system 100 in accordance with an embodiment of the present disclosure.

The inspecting system 100 operates in the computer device 1. The inspecting system 100 can include a plurality of modules. The plurality of modules can comprise computerized instructions in a form of one or more computer-readable programs that can be stored in a non-transitory computer-readable medium (e.g., a storage device of the computer device), and executed by at least one processor of the computer device to implement inspection function (described in detail in FIG. 1).

The inspecting system 100 may include functional modules consisting of program code. The functional modules can include an obtaining module 101, an associating module 102, a comparing module 103, a displaying module 104, an adjusting module 105, an analyzing module 106, a determining module 107, and a controlling module 108.

The obtaining module 101 is configured to obtain a plurality of first device identifiers of a plurality of light sources 2 and a plurality of second device identifiers of a plurality of control devices 3.

In one embodiment, the first device identifier may be a network identifier or a custom identifier, and the network identifier includes at least an IP address or a MAC address. The second device identifier may be a network identifier of the control device 3. The custom identifier may be an identifier defined to allow identification of the light source to be detected. For example, C1, C2, and C3 respectively identify three types of light sources.

The associating module 102 is configured to associate each first device identifier with the second device identifiers, and generate a binding list.

In one embodiment, the control device communicates with the corresponding light source 2 which is bound. The control device 3 can control a switch of the light sources by transmitting a control command.

The comparing module 103 is configured to compare the second device identifier corresponding to the camera device 4 to be queried against the binding list, to obtain a corresponding first device identifier.

In one embodiment, the control device 3 communicates with the corresponding camera device, and the control device can control the camera device to take a picture under the corresponding light source 2.

The displaying module 104 is configured to establish a graphical user interface, and display the first device identifier of the light source 2 and the result of analysis of the camera device 4 through the graphical user interface.

The adjusting module 105 is configured to dynamically adjust the binding relationship between each of the second device identifiers and the first device identifiers according to analysis of the camera device 4 or a performance of the light source 2.

The analyzing module 106 is configured to analyze whether the function of the camera device 4 is normal according to the pictures captured.

In one embodiment, the analyzing module 106 analyzes whether the function of the camera device 4 is normal according to the light source information of the light source 2 and the pictures captured by the camera device 4.

The determining module 107 is configured to determine whether the light source information of the light source 2 meets the requirements.

In one embodiment, the determining module 107 determines whether the light source information of the light source 2 meets the requirements according to the standards requirement of the camera device 4. The light source information may include the color temperature in the light source.

The computer device 1 obtains the color temperature of the light source corresponding to each control device 3, and determines whether the color temperature of the light source 2 meets the requirements according to the requirements of the camera device 4 for the light source information.

In another embodiment, the light source information may further include light intensity, light color, or light brightness.

The controlling module 108 is configured to send a calibration instruction to a color calibrator, to calibrate the color temperature of the light source 2 to a preset value.

In one embodiment, when the light source information of the light source 2 does not meet the detection requirement of the camera device 4, the controlling module 108 may output a warning, such as sound and light alarm or email alarm. The controlling module 108 may also control the graphical user interface to display a prompt error to prompt the user.

Figure 3:
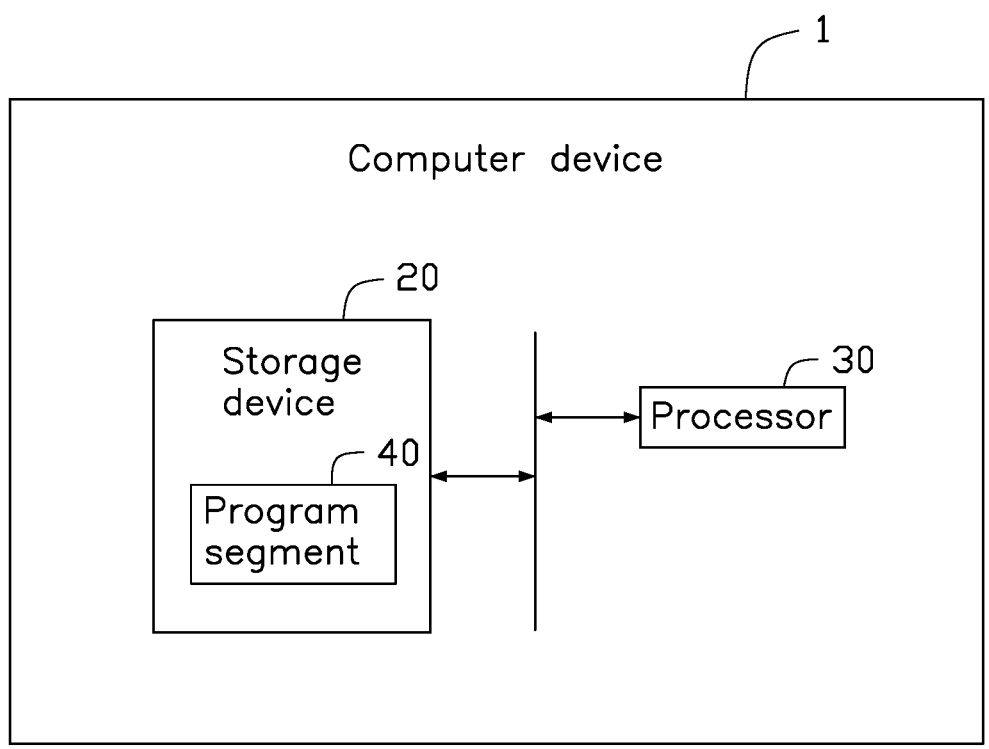
FIG. 3 and FIG. 4 are block diagrams of an embodiment of a computer device.

FIGS. 3 and 4 illustrate a computer device 1 in accordance with an embodiment of the present disclosure.

The computer device 1 can further include, but is not limited to, a storage device 20, at least one processor 30, and a program segment 40 stored in the storage device 20. The processor 30 may execute the program code of program segment 40 to implement blocks 11-19 in method shown in FIG. 2. The processor 30 may execute the program code of program segment 40 to implement the functions of an inspecting system 100 for inspecting device shown in FIG. 2.

The modules 101-108 include computer instructions or codes in form of one or more programs that may be stored in the storage device 20, and which are executed by the at least one processor 30. In other embodiment, the modules 101-108 may also be a program instruction or firmware that is embedded in the processor 30.

The block diagram merely shows an example of the computer device 1 and does not constitute a limitation to the computer device 1. In other examples, more or less components than those illustrated may be included, or some components may be combined, or different components used. For example, the computer device 1 may also include input and output devices, a network access devices, a bus, and the like.

In one embodiment, the computer device 1 may be a desktop computer, a notebook, a palmtop computer, or a cloud server.

The processor 30 may be a central processing unit (CPU), or may be another general purpose processor, a digital signal processor (DSP), an application specific integrated circuit (ASIC), a Field-Programmable gate array (FPGA) or other programmable logic device, a transistor logic device, a discrete hardware component. The general purpose processor may be a microprocessor. The processor 12 may also be any conventional processor. The processor 30 is a control center of the computer device 1. The processor 30 connects the parts of computer device 1 by using various interfaces and lines.

The storage device 20 can be used to store the program segment 40. The processor 30 operates or executes the program segment stored in the storage device 20 and recalls data stored in the storage device 20, and implements various functions of the computer device 1. The storage device 20 may mainly include a storage program area and a storage data area, the storage program area may store an operating system, an application (such as sound playback and image playback) required for at least one function. The storage data area may store data created.

The storage device 20 may include a RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

The modules and units integrated by the computer device 1, if implemented in the form of software functional units and sold or used as separate products, may be stored in a computer readable storage medium. Based on such understanding, the present disclosure implements all or part of the processes in the foregoing embodiments, and the purposes of the disclosure may also be implemented and achieved by a computer program instructing related hardware. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for inspecting and controlling a device and operating in a computer device, comprising:
   obtaining a first device identifier of a plurality of light sources;
   obtaining a second device identifier of a plurality of control devices; wherein each of the control devices respectively controls turning on a corresponding one of the light sources; wherein the control device corresponds to a camera device;
   associating the first device identifier with a corresponding one of the second device identifier, and generating a binding list;
   obtaining the second device identifier of the control device corresponding to the camera device;
   obtaining light source information of the second device identifier corresponding to the first device identifier; and determining whether the light source information meets a requirement of the camera device; wherein the light source information comprises color temperature in the light source;
   obtaining the color temperature of the light source corresponding to each control device, and determining whether color temperature of the light source meets a requirement of the camera device;
   comparing the second device identifier of the control device corresponding to the camera device with the binding list, and recording the first device identifiers corresponding to the second device identifiers; and controlling the camera device to sequentially capture a picture under the light source corresponding to the first device identifiers; and
   analyzing whether functions of the camera device are normal according to the picture.

2. The method according to claim 1, wherein the first device identifier is a network identifier or a custom identifier, and the second device identifier is a network identifier of the control device.

3. The method according to claim 1, further comprising:
   sending a calibration instruction when the light source information is determined not meeting the requirement of the camera device; and
   calibrating a color temperature of the light source.

4. The method according to claim 1, further comprising:
   creating a graphical user interface; and
   displaying the first device identifier of the light source and results of analysis of the functions of the camera device through the graphical user interface.

5. The method according to claim 1, further comprising:
   adjusting dynamically a relationship between each the second device identifier and the first device identifiers.

6. The method according to claim 1, wherein the light source information further comprises light intensity, light color or light brightness.

7. A computer device, comprising:
   a storage device; and
   at least one processor, wherein the storage device stores one or more programs, when executed by the at least one processor, the one or more programs cause the at least one processor to:
   obtaining a first device identifier of a plurality of light sources;
   obtain a second device identifier of a plurality of control devices; wherein each of the control devices respectively controls turning on a corresponding one of the light sources; wherein the control device corresponds to a camera device;
   associate the first device identifier with a corresponding one of the second device identifier, and generate a binding list;
   obtain the second device identifier of the control device corresponding to the camera device;
   obtain light source information of the second device identifier corresponding to the first device identifier; and determine whether the light source information meets a requirement of the camera device; wherein the light source information comprises color temperature in the light source;
   obtain the color temperature of the light source corresponding to each control device, and determine whether color temperature of the light source meets a requirement of the camera device;
   compare the second device identifier of the control device corresponding to the camera device with the binding list, and record the first device identifiers corresponding to the second device identifiers; and control the camera device to sequentially capture a picture under the light source corresponding to the first device identifiers; and
   analyze whether functions of the camera device are normal according to the picture.

8. The computer device according to claim 7, wherein the first device identifier is a network identifier or a custom identifier, and the second device identifier is a network identifier of the control device.

9. The computer device according to claim 7, wherein the at least one processor is further caused to:
   send a calibration instruction when the light source information is determined not meet the requirement of the camera device; and
   calibrate a color temperature of the light source.

10. The computer device according to claim 7, wherein the at least one processor is further caused to:
    create a graphical user interface; and
    display the first device identifier of the light source and results of analysis of the functions of the camera device through the graphical user interface.

11. The computer device according to claim 7, wherein the at least one processor is further caused to:
    adjust dynamically a relationship between each the second device identifier and the first device identifiers.

12. The computer device according to claim 7, wherein the light source information further comprises light intensity, light color or light brightness.

13. A non-transitory storage medium having stored thereon instructions that, when executed by a processor of a computer device, causes the processor to perform an analyzing method, wherein the method comprises:

obtaining a first device identifier of a plurality of light sources;

obtaining a second device identifier of a plurality of control devices; wherein each of the control devices respectively controls turning on a corresponding one of the light sources; wherein the control device corresponds to a camera device;

associating the first device identifier with a corresponding one of the second device identifier, and generating a binding list;

obtaining the second device identifier of the control device corresponding to the camera device;

obtaining light source information of the second device identifier corresponding to the first device identifier; and determining whether the light source information meets a requirement of the camera device; wherein the light source information comprises color temperature in the light source;

obtaining color temperature of the light source corresponding to each control device, and determining whether color temperature of the light source meets a requirement of the camera device;

comparing the second device identifier of the control device corresponding to the camera device with the binding list, and recording the first device identifiers corresponding to the second device identifiers; and controlling the camera device to sequentially capture a picture under the light source corresponding to the first device identifiers; and analyzing whether functions of the camera device are normal according to the picture.

14. The non-transitory storage medium according to claim 13, wherein the first device identifier is a network identifier or a custom identifier, and the second device identifier is a network identifier of the control device.

15. The non-transitory storage medium according to claim 13, further comprising:

sending a calibration instruction when the light source information is determined not meeting the requirement of the camera device; and calibrating a color temperature of the light source.

16. The non-transitory storage medium according to claim 13, further comprising:

creating a graphical user interface; and displaying the first device identifier of the light source and results of analysis of the functions of the camera device through the graphical user interface.

17. The non-transitory storage medium according to claim 13, further comprising:

adjusting dynamically a binding relationship between each the second device identifier and the first device identifiers.

* * * * *